(12) United States Patent
MacNeille et al.

(10) Patent No.: US 9,328,698 B2
(45) Date of Patent: May 3, 2016

(54) AUTOMOTIVE VIRTUAL HUMIDITY SENSOR

(71) Applicant: Ford Global Technologies, LLC, Dearborn, MI (US)

(72) Inventors: Perry Robinson MacNeille, Lathrup Village, MI (US); David Charles Weber, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 13/894,270

(22) Filed: May 14, 2013

(65) Prior Publication Data

US 2014/0338644 A1 Nov. 20, 2014

(51) Int. Cl.
| | |
|---|---|
| *F02B 47/08* | (2006.01) |
| *F02M 25/07* | (2006.01) |
| *F02D 21/08* | (2006.01) |
| *F02D 29/02* | (2006.01) |
| *F02D 37/02* | (2006.01) |
| *F02D 41/00* | (2006.01) |

(Continued)

(52) U.S. Cl.
CPC ........... *F02M 25/0753* (2013.01); *F02D 21/08* (2013.01); *F02D 29/02* (2013.01); *F02D 37/02* (2013.01); *F02D 41/005* (2013.01); *F02M 25/0755* (2013.01); *F02B 1/12* (2013.01); *F02D 13/0265* (2013.01); *F02D 41/0072* (2013.01); *F02D 2021/083* (2013.01); *F02D 2200/0406* (2013.01); *F02D 2200/0414* (2013.01); *F02D 2200/0418* (2013.01); *F02D 2200/701* (2013.01); *F02D 2200/703* (2013.01); *F02M 25/0754* (2013.01); *F02M 25/0777* (2013.01); *F02M 2025/0757* (2013.01); *Y02T 10/121* (2013.01); *Y02T 10/47* (2013.01)

(58) Field of Classification Search
CPC ........... F02M 25/0777; F02M 25/0754; F02D 41/0072; F02D 41/005; F02D 2200/0406
USPC .................................................... 123/568.22
See application file for complete search history.

(56) References Cited

U.S. PATENT DOCUMENTS 5,988,149 A * 11/1999 Gates ....................... 123/568.21
6,236,908 B1    5/2001 Cheng et al.
(Continued)

FOREIGN PATENT DOCUMENTS

WO    2011138387 A1    11/2011

OTHER PUBLICATIONS

Michael Raia, Why You Should Choose a Cloud-Based GPS Tracking System, Feb. 28, 2011, Fleetmatics, pp. 1 and 2.*

(Continued)

*Primary Examiner* — Stephen K Cronin
*Assistant Examiner* — Charles Brauch
(74) *Attorney, Agent, or Firm* — Julia Voutyras; Alleman Hall McCoy Russell & Tuttle LLP

(57) ABSTRACT

Systems and methods are provided for adjusting an engine powertrain component responsive to ambient humidity, the ambient humidity based on vehicle position in a region, clock time ambient temperature, and historical humidity data for that region for a current time of year. This may be accomplished without relying on a costly, and often, temperamental physical humidity sensor. Training modules and cloud updates may further increase the accuracy of the virtual humidity sensor of the present disclosure.

19 Claims, 11 Drawing Sheets

(51) Int. Cl.
*F02B 1/12* (2006.01)
*F02D 13/02* (2006.01)

(56) References Cited

U.S. PATENT DOCUMENTS

| | | |
|---|---|---|
| 6,405,106 B1 | 6/2002 | Sheth et al. |
| 6,725,847 B2 | 4/2004 | Bruneman et al. |
| 6,882,929 B2 | 4/2005 | Liang et al. |
| 7,953,530 B1 * | 5/2011 | Pederson et al. ............. 701/31.7 |
| 2008/0109122 A1 | 5/2008 | Ferguson et al. |
| 2009/0254145 A1 | 10/2009 | Gross et al. |
| 2009/0254257 A1 * | 10/2009 | Dlugoss et al. ................. 701/65 |
| 2010/0267344 A1 * | 10/2010 | Guner et al. ............... 455/67.11 |
| 2010/0326408 A1 | 12/2010 | Clarke et al. |
| 2010/0332075 A1 | 12/2010 | Clarke et al. |
| 2011/0238246 A1 * | 9/2011 | Martini et al. .................. 701/22 |
| 2011/0265191 A1 * | 10/2011 | Russo et al. .................... 726/34 |
| 2012/0158207 A1 | 6/2012 | MacNeille et al. |
| 2013/0231798 A1 * | 9/2013 | Zurawski et al. ................. 701/1 |

OTHER PUBLICATIONS

Alahmer, A. et al., "Effect of Relative Humidity and Temperature Control on In-Cabin Thermal Comfort State: Thermodynamic and Psychometric Analyses", Applied Thermal Engineering, vol. 31, Issues 14-15, pp. 2636-2644, Oct. 2011, 9 pages.

* cited by examiner

AUTOMOTIVE VIRTUAL HUMIDITY SENSOR

TECHNICAL FIELD

The present application relates to humidity sensors for vehicles.

BACKGROUND AND SUMMARY

To meet increasingly stringent fuel economy and provide impetus to develop powertrain controls that use specific humidity as an input on some vehicles to control engine operating parameters such as air-fuel ratio, exhaust gas recirculation rate, etc. As the specific humidity affects aircharge density, universal gas constant, ratio of specific heats and oxygen content among other things, accurate specific humidity data is used in calculation of EGR rates, spark timing, and control of air-fuel ratio and other powertrain controls. Incorporating specific humidity into calculations for such parameters has previously involved a humidity sensor on a vehicle. Development of a sensor to measure specific humidity in a vehicle is difficult because such devices use precise measurement of specific heat or air density. Further, some of the water in the air is not in the form of vapor, but as an aerosol which further complicates humidity measurement. As this is rarely feasible in a moving vehicle a relative humidity device has been used that estimates specific humidity from the relative humidity, the ambient temperature and the ambient pressure.

Estimating the specific humidity based on relative humidity results in a loss of accuracy because estimation of the saturation specific humidity is inaccurate and depends on factors such as the presence of ice and water in the surface environment and the size and chemistry of aerosol particles in the air among other factors. Furthermore, relative humidity sensors are expensive and temperamental. Without calibration, the accuracy of relative humidity sensors may be drastically reduced. Due to the variable nature of direct humidity sensors, use of additional, humidity sensors or additional, paired weather sensors may be necessary.

The inventors herein recognize the aforementioned difficulties and associated costs of a physical humidity sensor or other weather sensors and disclose systems and methods for deriving the specific humidity from sensor data readily available on the vehicle bus. A virtual humidity sensor is disclosed that accepts inputs from the vehicle position/time/date sensor, an ambient temperature sensor, a barometric pressure sensor, and other data normally available on the vehicle bus such as windshield wiper status, pyrometer measurements, fuel density, etc. External data from a wireless device, if it is available, may be used to increase the accuracy of the calculation. Wireless devices like IBOC (in-band on-channel, e.g. HD Radio) and Satellite radios are now installed on most vehicles these devices may receive data collected from weather stations and broadcast by local radio stations.

The disclosed sensor may be an informational filter implemented in software and run on a computer embedded on the vehicle and connected to the vehicle (CAN) bus. The filter will be implemented as a learning algorithm such as a neural network that is first trained offline using historical weather and other data, and then later can be trained online (in the vehicle) with external data when it is available.

Systems and methods are provided for adjusting an engine powertrain component responsive to ambient humidity, the ambient humidity based on vehicle position in a region, ambient temperature, and historical humidity data for that region for a current time of year and the time of the day. This may be accomplished without relying on a costly, and often, temperamental physical humidity sensor. Training modules and cloud updates further increase the accuracy of the virtual humidity sensor of the present disclosure.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The object of the present disclosure is a virtual humidity sensor. The disclosed sensor utilizes existing vehicle sensors with historical humidity data for a given area to estimate the specific humidity. The specific humidity is of increasing importance to powertrain controls such as exhaust gas circulation rates and spark timing as the specific humidity relates to aircharge density and available oxygen content as examples. Readily available historical climate data can be preloaded into an ECU memory. Furthermore, the virtual humidity sensor may be trained as connections are available for an ECU to connect to the internet or satellite radio to receive a true humidity value, for example.

Figure 1:
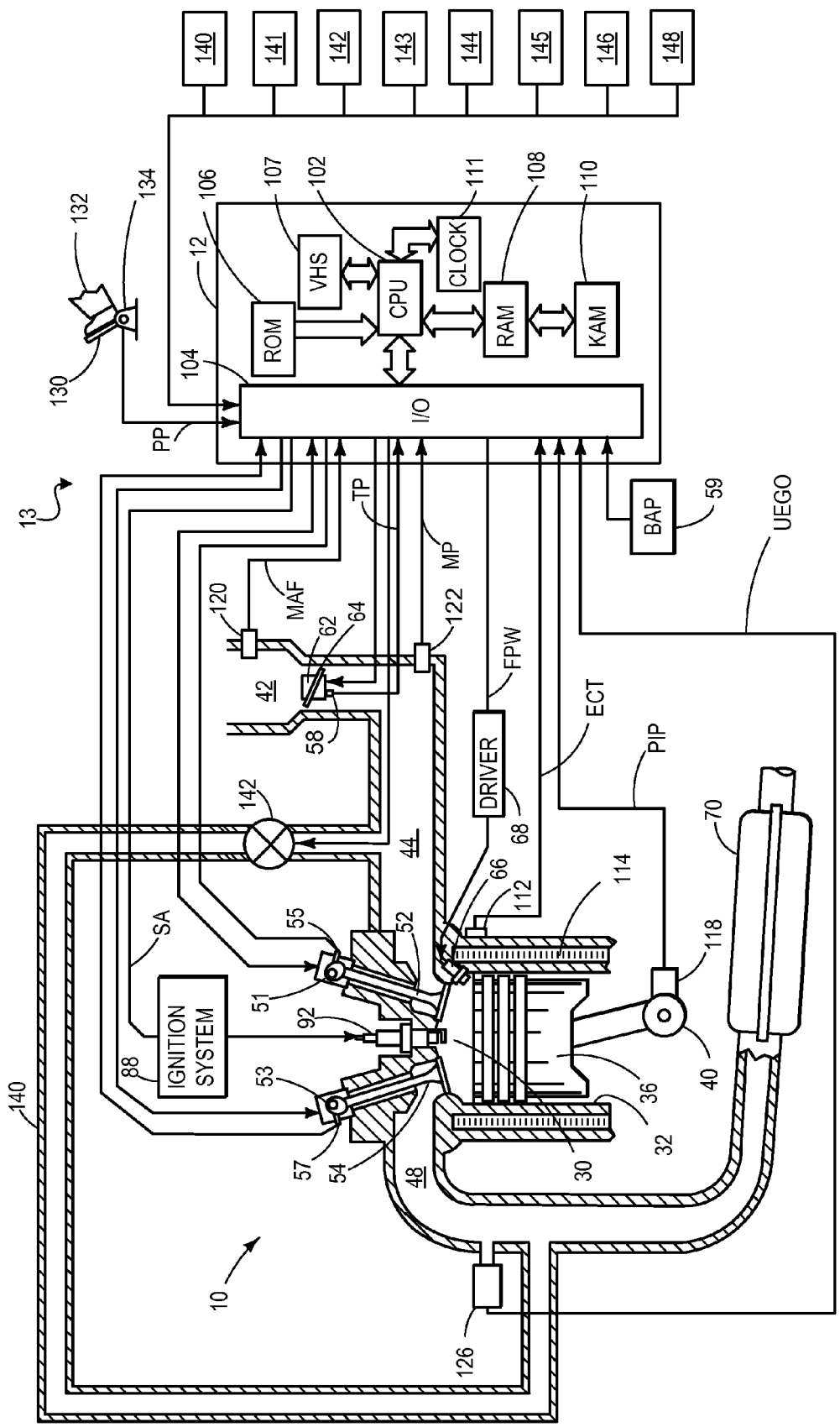
FIG. 1 shows an example cylinder of an engine.
Figure 2:
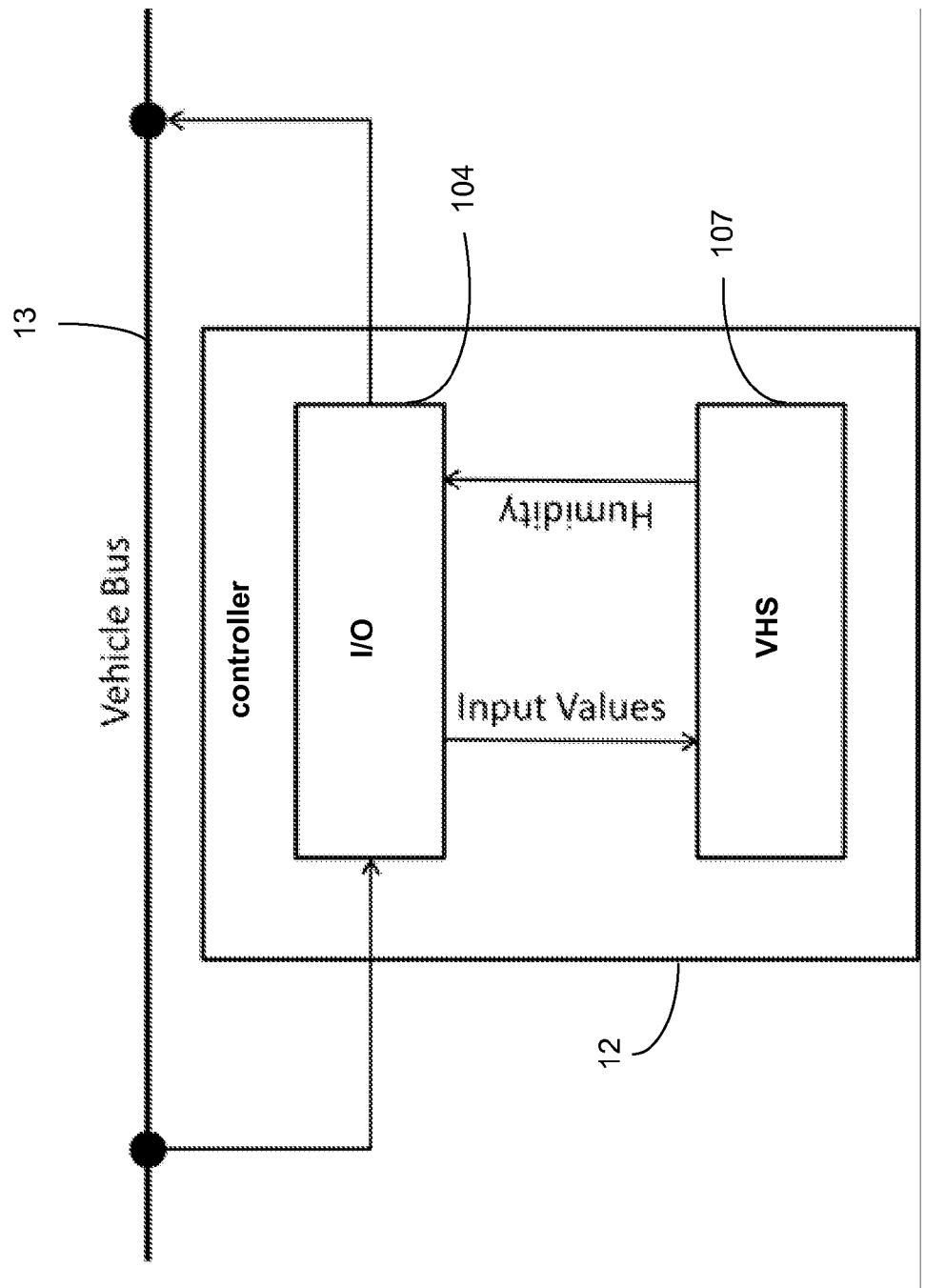
FIG. 2 shows a diagram of the virtual sensor in a non-training mode.
Figure 6:
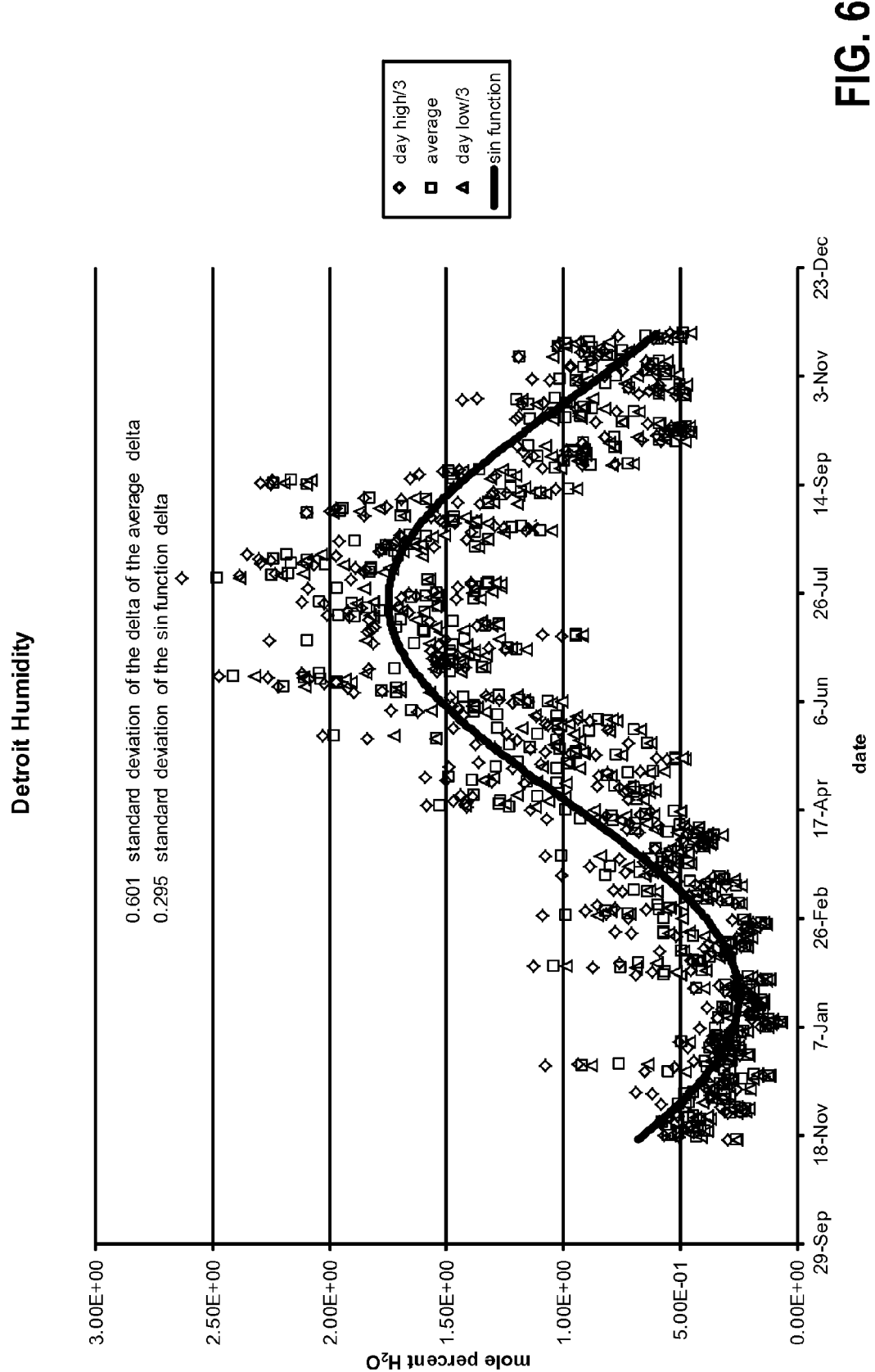
FIG. 6 shows example humidity data from Detroit.
Figure 7:
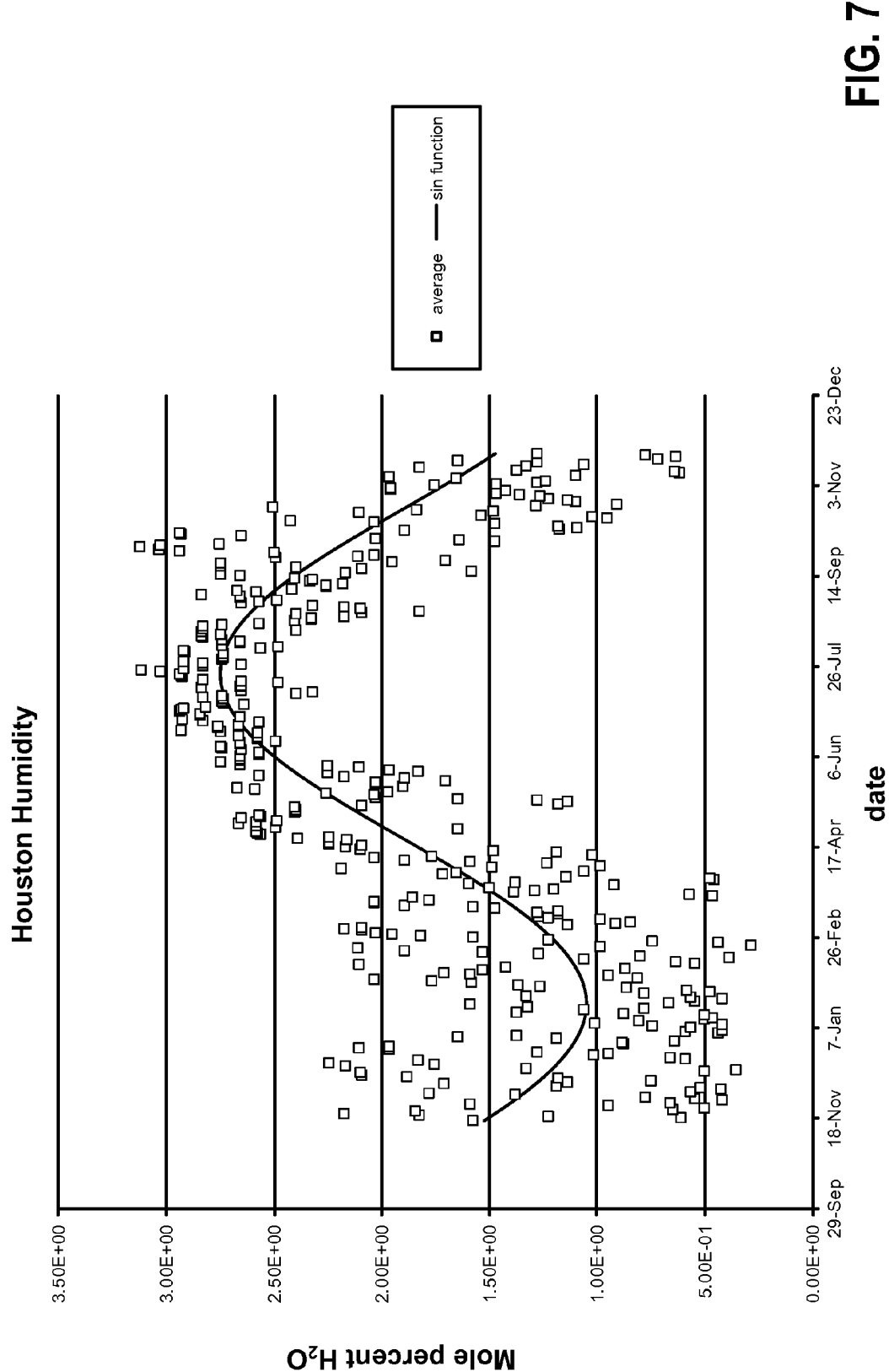
FIG. 7 shows example humidity data from Houston.
Figure 8:
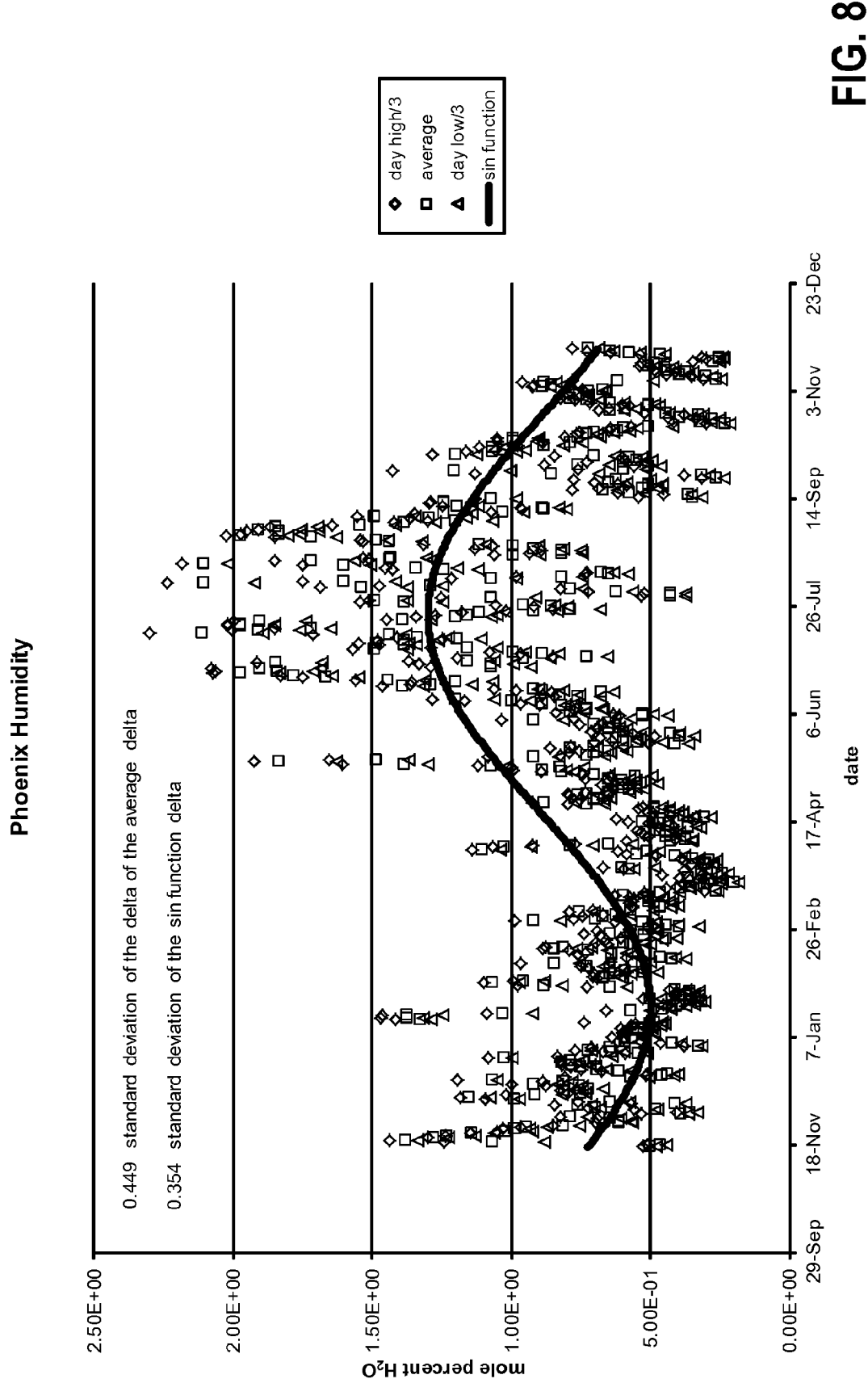
FIG. 8 shows example humidity data from Phoenix.

The object of the present disclosure will be described in greater detail below with reference to the figures. FIG. 1 shows an example cylinder of an engine and various physical sensors that may be used by the virtual humidity sensor in estimating specific humidity. FIGS. 2-5 show diagrams of different operating modes of the virtual humidity sensor. FIGS. 6-8 show examples of historical humidity data of the kind that may be utilized by the virtual humidity sensor in estimating specific humidity or in a training mode to update the virtual sensor.

Referring to FIG. 1, internal combustion engine 10 comprises of a plurality of cylinders, one cylinder of which is shown in FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown as a direct-injection device coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 for providing mass air flow MAF signal to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, an exhaust gas recirculation (EGR) system may route a desired portion of exhaust gas from exhaust passage 48 to intake manifold 44 via EGR passage 140 through EGR valve 142 and EGR orifice (not shown). The exhaust gas recirculated through the EGR system may be directed to all the cylinders present in the multi-cylinder engine through intake manifold 44. In a turbocharged engine (not shown), the EGR system may be a high-pressure system (from upstream of the turbine to downstream of the compressor) or a low-pressure EGR system (from downstream of the turbine to upstream of the compressor).

Controller 12 is shown in FIG. 1 as a conventional microcomputer including: microprocessor unit 102, input/output ports 104, read-only memory 106, random access memory 108, keep alive memory 110, a clock 111 and a conventional data bus indicated general at 13. Further controller 12 may comprise a vehicle logic unit. The logic unit may be suitable to facilitate the transfer of information to and from an external network such as satellite radio, IBOC radio, or the internet and the vehicle bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Intake manifold pressure may also be sensed by a MAP sensor 122 for processing by controller 12. A BAP (barometric pressure sensor) 59 measures the ambient absolute pressure. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

For example, engine 10 may be operated as a homogeneous charge compression ignition (HCCI) engine. In SI combustion, ignition system 88 provides an ignition spark to combustion chamber 30 via spark plug 92 in response to spark advance signal SA from controller 12. Alternately, engine 10 may opt to perform an HCCI mode of combustion, wherein an air and fuel mixture achieves a temperature where combustion occurs by auto-ignition without requiring a spark by a sparking device. During HCCI, or a controlled auto-ignition (CAI), auto-ignition of combustion chamber gases occur at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion.

Controller 12 may further comprise a virtual humidity sensor 107 as described herein. The virtual humidity sensor may receive inputs from a position system such as a GPS (global positioning system) 141, a global clock time may also be provided by GPS 141, a fuel quality sensor 142, an intake air sensor 140, a pyrometer 143, a windshield wiper status sensor 144, ambient temperature sensor 146, and fuel density sensor 148 among others as well as the rate of change of these variables over different time intervals. These sensors may be existing sensors on the vehicle and provide sensory inputs to varied systems throughout a vehicle and an internal combustion engine in addition to contributing data to a virtual humidity sensor. A pyrometer 143 may be used in place of a light sensor 145 for knowing solar heat flux.

The use and importance of a specific humidity measurement to vehicle operations are widespread. Humidity is an important noise factor in the MAF sensor accounting for as much as 8% error in readings. In one example, the humidity value obtained by a virtual humidity sensor of the present disclosure may be used in calculating a mass air flow, or in calculating an offset or error in a MAF sensor.

Humidity may also be used for climate control applications to anticipate a dehumidification requirement and estimate the energy consumption of dehumidification. In another example, an engine controller may use an estimated humidity from a virtual humidity sensor of the present disclosure in calculating an output for a climate control system. For example, high humidity may require increased air conditioning output.

Humidity may also be used in estimating the heat capacity of the air for cooling the battery on electric or hybrid-electric vehicles. In an embodiment where a virtual humidity sensor in accordance with the present disclosure may be mounted in a hybrid-electric or electric vehicle comprising batteries, a humidity estimate produced by the virtual humidity sensor may be used by an engine controller in calculating or estimating cooling needs for the batteries of such a vehicle. Air density and heat capacity are important factors in high quality distance-to-empty calculations necessary for hybrid-electric and electric vehicles. As the specific humidity affects both the air density and heat capacity, an engine controller may further consider a humidity value produce by a virtual humidity sensor in calculating remaining battery output.

Dewpoint-Ambient temperature spread is important for anticipating poor visibility due to fog and for black ice detection. A vehicle equipped with visibility detection systems that operate lights or other vehicle features may further use a humidity estimate from a virtual humidity sensor of the present disclosure in determining if lights should be activated, for example. Furthermore, vehicles with ice alert systems or traction control may consider a humidity value from a virtual humidity sensor in warning a driver of the potential for black ice or in engaging a traction control or anti-lock braking systems, as examples.

Furthermore, specific humidity has an effect on cam timing in HCCI engines. In an engine operating by HCCI an engine controller may consider a humidity value produce by a virtual humidity sensor of the present disclosure to advance or retard cam timing, for example.

In another example where a virtual humidity sensor of the present disclosure is used in connection with a diesel engine specific humidity may be used to recalibrate ammonia sensors in selective catalytic reduction diesel emission systems. An engine controller may use a humidity value in the calibration of ammonia sensors, which may in turn alter injection timing or dosing of urea, or DPF regeneration, as examples.

The virtual humidity sensor of the present disclosure may store historical climate data for given locations, various lookup tables, and formulas for calculating humidity. Such data may be preloaded into an engine controller and may be updated periodically, when a vehicle goes in for servicing for example, or when a wireless connection becomes available. An example data table that can be used in estimating the specific humidity is shown below.

TABLE 1

| Typical data for offline training | | | | | | | | |
|---|---|---|---|---|---|---|---|---|
| GMT (date/time) | Longitude (°) | Latitude (°) | Elevation (Ft) | Temperature (F.°) | Barometric Pressure (InHg) | Precipitation (In) | Cloud Cover | Humidity |
| Sep. 6, 2011 | −83.4001 | 42.0052 | 756 | 62 | 30.15 | 4 | | 57 |
| Sep. 7, 2011 | −83.4001 | 42.0052 | 756 | 64 | 30.14 | 2 | | 53 |
| Sep. 8, 2011 | −83.4001 | 42.0052 | 756 | 68 | 30.03 | 7 | Rain | 67 |
| Sep. 9, 2011 | −83.4001 | 42.0052 | 756 | 68 | 29.94 | 8 | Rain | 87 |
| Sep. 10, 2011 | −83.4001 | 42.0052 | 756 | 68 | 30 | 4 | Fog | 82 |
| Sep. 11, 2011 | −83.4001 | 42.0052 | 756 | 72 | 29.99 | 2 | | 67 |

TABLE 1-continued

Typical data for offline training

| GMT (date/time) | Longitude (°) | Latitude (°) | Elevation (Ft) | Temperature (F.°) | Barometric Pressure (InHg) | Precipitation (In) | Cloud Cover | Humidity |
|---|---|---|---|---|---|---|---|---|
| Sep. 12, 2011 | −83.4001 | 42.0052 | 756 | 75 | 29.92 | 3 | | 59 |
| Sep. 13, 2011 | −83.4001 | 42.0052 | 756 | 69 | 29.88 | 0 | | 61 |
| Sep. 14, 2011 | −83.4001 | 42.0052 | 756 | 56 | 30.07 | 5 | Rain | 70 |
| Sep. 15, 2011 | −83.4001 | 42.0052 | 756 | 50 | 30.33 | 3 | | 52 |
| Sep. 16, 2011 | −83.4001 | 42.0052 | 756 | 54 | 30.34 | 8 | | 56 |
| Sep. 17, 2011 | −83.4001 | 42.0052 | 756 | 60 | 30.27 | 4 | | 54 |
| Sep. 18, 2011 | −83.4001 | 42.0052 | 756 | 60 | 30.09 | 8 | Rain | 84 |
| Sep. 19, 2011 | −83.4001 | 42.0052 | 756 | 64 | 29.93 | 6 | Rain | 86 |
| Sep. 20, 2011 | −83.4001 | 42.0052 | 756 | 64 | 30.02 | 5 | Fog | 77 |
| Sep. 21, 2011 | −83.4001 | 42.0052 | 756 | 66 | 29.94 | 3 | | 60 |
| Sep. 22, 2011 | −83.4001 | 42.0052 | 756 | 58 | 30.08 | 6 | | 66 |
| Sep. 23, 2011 | −83.4001 | 42.0052 | 756 | 54 | 30.06 | 5 | Rain | 71 |
| Sep. 24, 2011 | −83.4001 | 42.0052 | 756 | 56 | 29.99 | 7 | Rain | 76 |
| Sep. 25, 2011 | −83.4001 | 42.0052 | 756 | 58 | 29.88 | 7 | Rain | 83 |
| Sep. 26, 2011 | −83.4001 | 42.0052 | 756 | 58 | 29.64 | 8 | Rain | 83 |

The virtual humidity sensor of the present disclosure estimates humidity by, among other things, reading the Greenwich mean time (GMT) from an onboard clock or the GPS. Information from the onboard clock may include the time of day, time of year, month, date, season, etc. The seasons may include the four seasons of summer, winter, fall, and spring. Latitude, longitude and elevation may be provided by an existing GPS 141, or other location device. Elevation may further be inferred from known latitude and longitude using a stored lookup table of elevation by global position. GPS location may be used to distinguish the location by a specific city, state, county, zip code, or specific latitude and longitude as in the example above. The designated region or specificity may be the result of where data is available. Ambient temperature may be provided by an ambient temperature sensor 146. Information as to precipitation may be provided by a windshield wiper status sensor 144. Some vehicles may further be outfitted with light condition sensors 145 which are used on many vehicles to control or signal for headlights in foggy, cloudy, or other low-light conditions. Furthermore, barometric pressure may be sensed by BAP sensor 59. From these inputs and tables like the one above, a probabilistic specific humidity may be provided in which both the expected specific humidity and the expectation interval are provided.

In a learning mode, the virtual humidity sensor attempts to estimate the humidity from the other values and compares it to the measured humidity in the last column of Table 1. The difference between the measured and calculated values is then used to correct parameters in the informational filter and the process is repeated until the differences no longer decrease with each repetition. The humidity column of Table 1 may correspond to direct measurements or it may correspond to humidity data derived from prior generations of virtual sensors. Furthermore, computer readable storage medium with a logic unit may be coupled to the bus and include instructions stored therein to uploading training module parameter updates and acquired humidity data to a cloud server external to the vehicle Turning now to FIG. 2, a diagram of the virtual humidity sensor while in a regular operating mode is shown. The vehicle bus 13 networks varied sensory inputs and output signals to and from input/output device 104 of controller 12. The vehicle bus may be configured as a CAN (controller area network), LIN (local interconnect network) or other network type. The virtual humidity sensor (VHS) is shown at 107 in its non-training state. In the non-training state, input values including data from a MAP sensor, GPS, clock, ambient temperature sensor, etc. are used by the virtual humidity sensor 107 and a humidity value is returned to input/output device 104. The humidity estimate is returned to the vehicle bus where it is used in the control of an exhaust gas recirculation rate, air-fuel ratio, or spark timing, as non-limiting examples.

Example methods for control of EGR rate or spark timing as they relate to humidity are provided here. Controlling the rate of exhaust gas recirculation in an internal combustion engine may be performed by generating an rpm value which is indicative of the rotational speed of the engine, generating an aircharge value which is indicative of aircharge entering an intake manifold of the engine and generating a humidity value which is indicative of the ambient humidity level. A multiplier is calculated as a function of the rpm value and the aircharge value. This multiplier represents the EGR percent change per grain of humidity deviation from a standard humidity. A base exhaust gas recirculation rate value is then determined as a function of at least the rpm value and the aircharge value. The base exhaust gas recirculation rate is then adjusted by the product of a multiplier and the quantity of a standard humidity less the observed humidity. Thus, the EGR rate may thus be compensated for the effect of atmospheric humidity.

The specific humidity is used in controlling other aspects of engine operation including spark timing. Borderline spark timing is necessary to provide efficient engine operation considering performance and emissions. Controlling the borderline spark timing of an internal combustion engine may be performed by generating an rpm value which is indicative of the rotational speed of the engine, generating an aircharge value which is indicative of aircharge entering an intake manifold of the engine and generating a humidity value which is indicative of the ambient humidity level. A multiplier may be calculated as a function of the rpm value and aircharge value. This multiplier represents the degree of spark change per grain of humidity possible without incurring engine knock. A borderline spark value is then calculated as a function of at least the rpm value and the aircharge value. The borderline spark value may then adjusted by the product of the multiplier and the estimated humidity to compensate the engine spark timing for the effect of humidity.

Furthermore, specific humidity may alter the comfort of a vehicle cabin. An additional use for an accurate specific humidity measurement is for control of the climate control system where it is used to estimate the dew point and heat capacity of the ambient air to improve vehicle safety by preventing fogging of the windows and improve comfort by keeping the climate in the thermal comfort zone.

Figure 3:
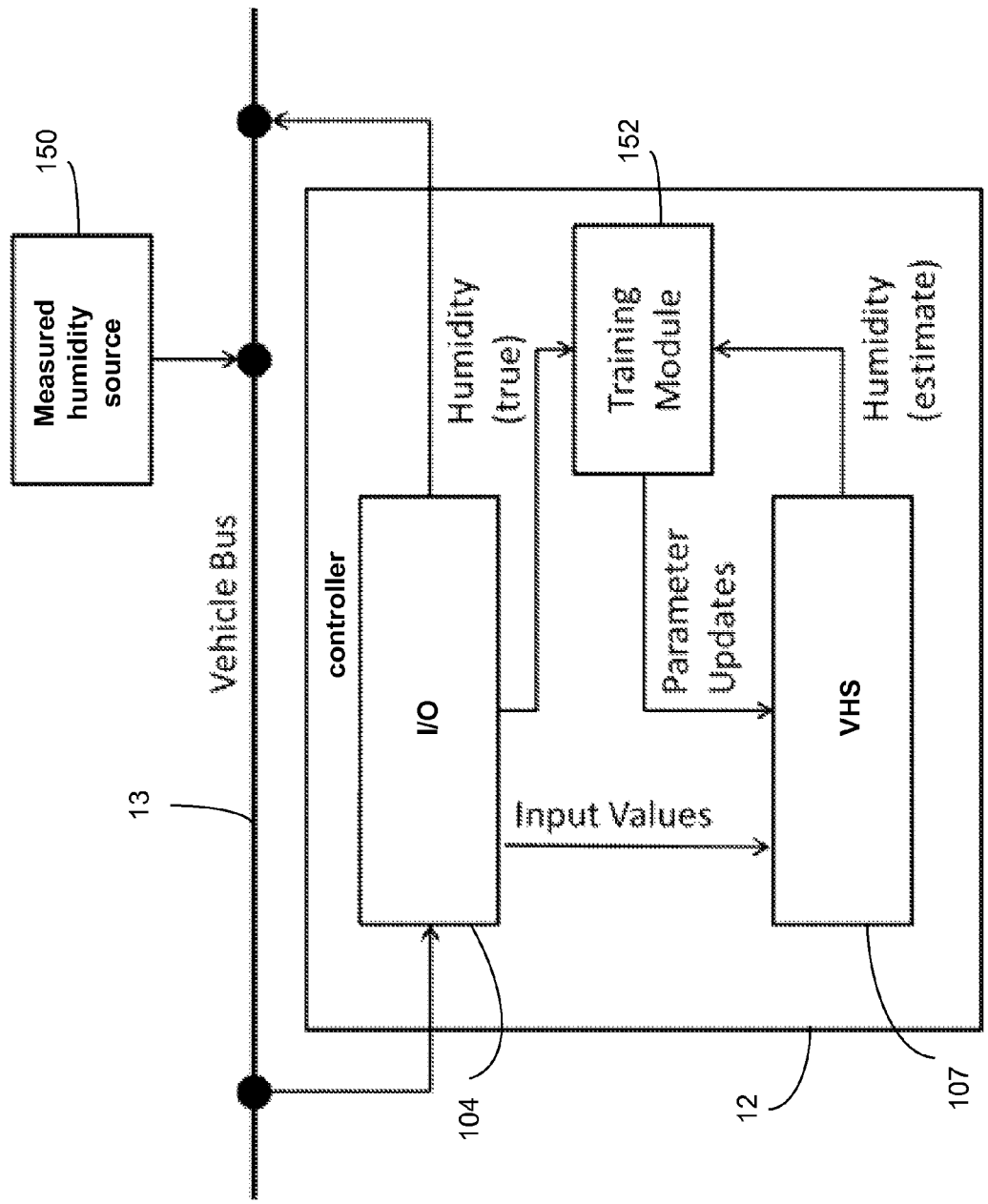
FIG. 3 shows a diagram of the virtual sensor in a training mode.

Turning now to FIG. 3 a diagram of the virtual humidity sensor in a training mode is shown. The training mode may be carried out during production; such that once the vehicle is on the road the virtual humidity sensor contains the most recent parameter updates and is sufficient to estimate a specific humidity immediately upon driving. A training mode may take effect when a vehicle is in a position to connect to measured or true humidity source. Such a connection may be a wireless internet connection, telephone connection, satellite radio connection and/or IBOC (in-band-on-channel e.g. HD) radio. Such connections may be used in connecting to an available connection, to receive the measured humidity and potentially exchange other data including uploading of acquired data and downloading updates for training or other purposes. Furthermore, a connection suitable to provide a measured specific humidity may be a hardwired connection. For example, during regular vehicle maintenance, a training module may be plugged into an external computer.

The training mode depicted in FIG. 3 comprises the components described above in reference to FIG. 2. A vehicle bus 13 connects to an engine controller 12. Within the engine controller and input/output device 104 provides input values to virtual humidity sensor 107. In addition, the vehicle bus connects to a measured humidity source 150. The measured humidity source feeds a true, measured specific humidity to a training module 152 via the input/output device 104. The virtual humidity sensor 107 uses a physics/statistics based black box model to estimate specific humidity and submits its estimate of the specific humidity to the training module 150. The training module determines a difference between the externally provided true humidity and the estimated humidity. The training module then provides parameter updates to the virtual humidity sensor 107. An estimated humidity is compared to the true humidity repeatedly until the difference between the two values ceases to decrease. The training mode may be carried out during production; such that once the vehicle is on the road the virtual humidity sensor contains the most recent parameter updates and is sufficient to estimate a specific humidity immediately upon driving. Further, a trained virtual humidity sensor can be transferred from vehicle to vehicle or from off-line training into an untrained vehicle. Unlike a physical humidity sensor that drifts over time the virtual sensor never drifts and can be updated with more recent parameters.

In other examples, training may occur throughout the lifetime of the sensor either as a periodic updates, for example, accompanying regularly schedule maintenance. Over time the filter becomes more accurate in the places it is commonly trained. With multiple vehicles carrying out the same training process in various locations, recorded humidity data and parameter updates from the training module may be uploaded and stored in a cloud server.

Figure 4:
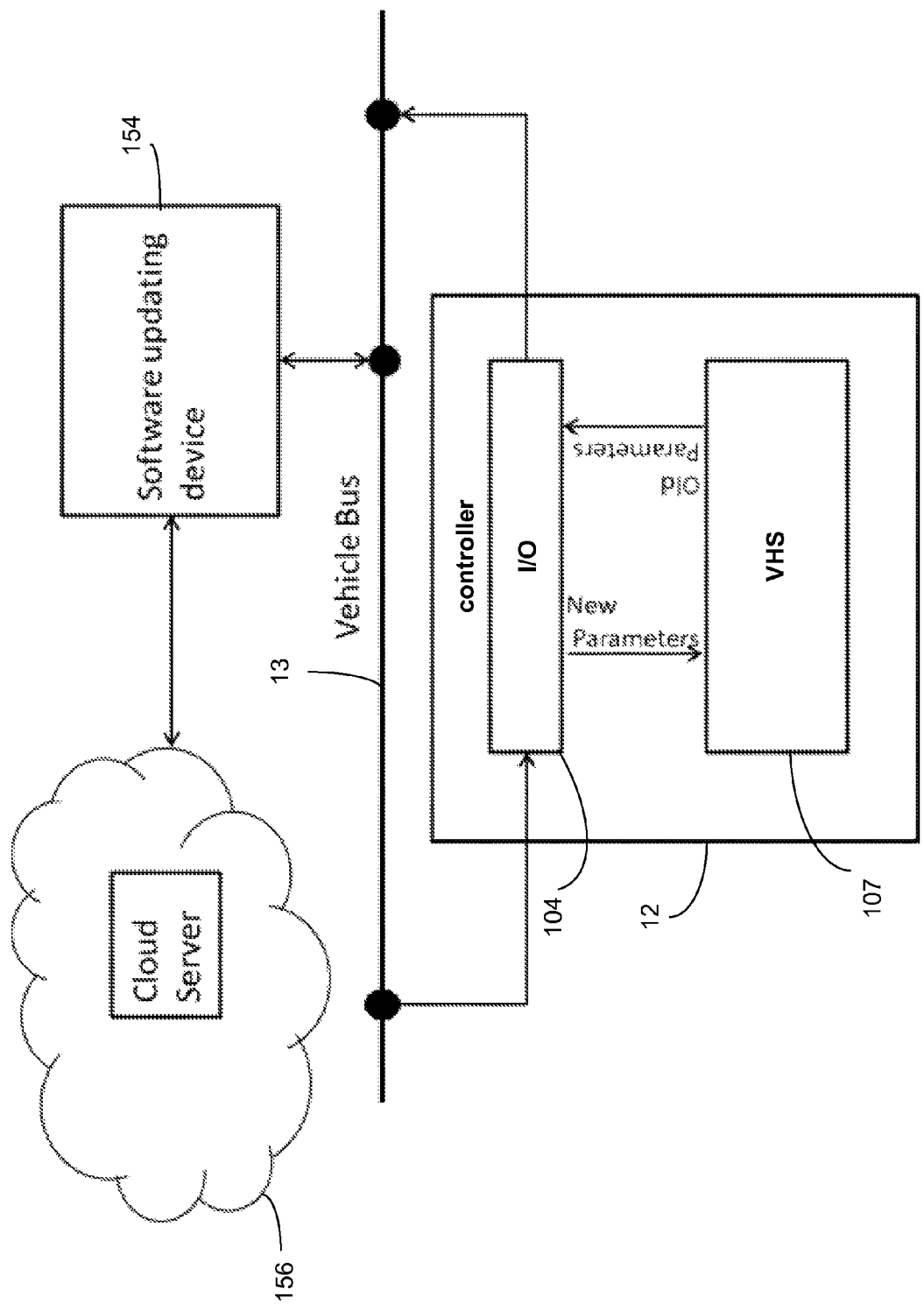
FIG. 4 shows a diagram of the virtual sensor in an update mode.

Turning now to FIG. 4, a diagram of the virtual humidity sensor in an update mode is shown. As described above, acquired humidity data and training module parameter updates may be uploaded to a cloud server when a suitable connection is available. In FIG. 4 a connection is made between the vehicle bus 13 and a software updating device 154. The software updating device may connect wirelessly. In another example, the software updating device may be connected via a hardwire connection by a vehicle user or by a service technician during regular maintenance for example.

The software updating device 154 uploads data to, and downloads data from, a cloud server 156. Sharing of data in this way helps to reduce the time of training a virtual humidity sensor as well as to increase accuracy, and to increase accuracy of a vehicle when traveling out of its home region. For example, if a vehicle is driven to a distant region with large climate differences, the acquired data from vehicles that regularly drive in the destination region may be used in training the vehicle or downloaded from the cloud server such that up to date data is available for retrieving an estimated specific humidity. This may increase accuracy of an estimated specific humidity in a non-home region and may also minimize an updating or training time.

Figure 5:
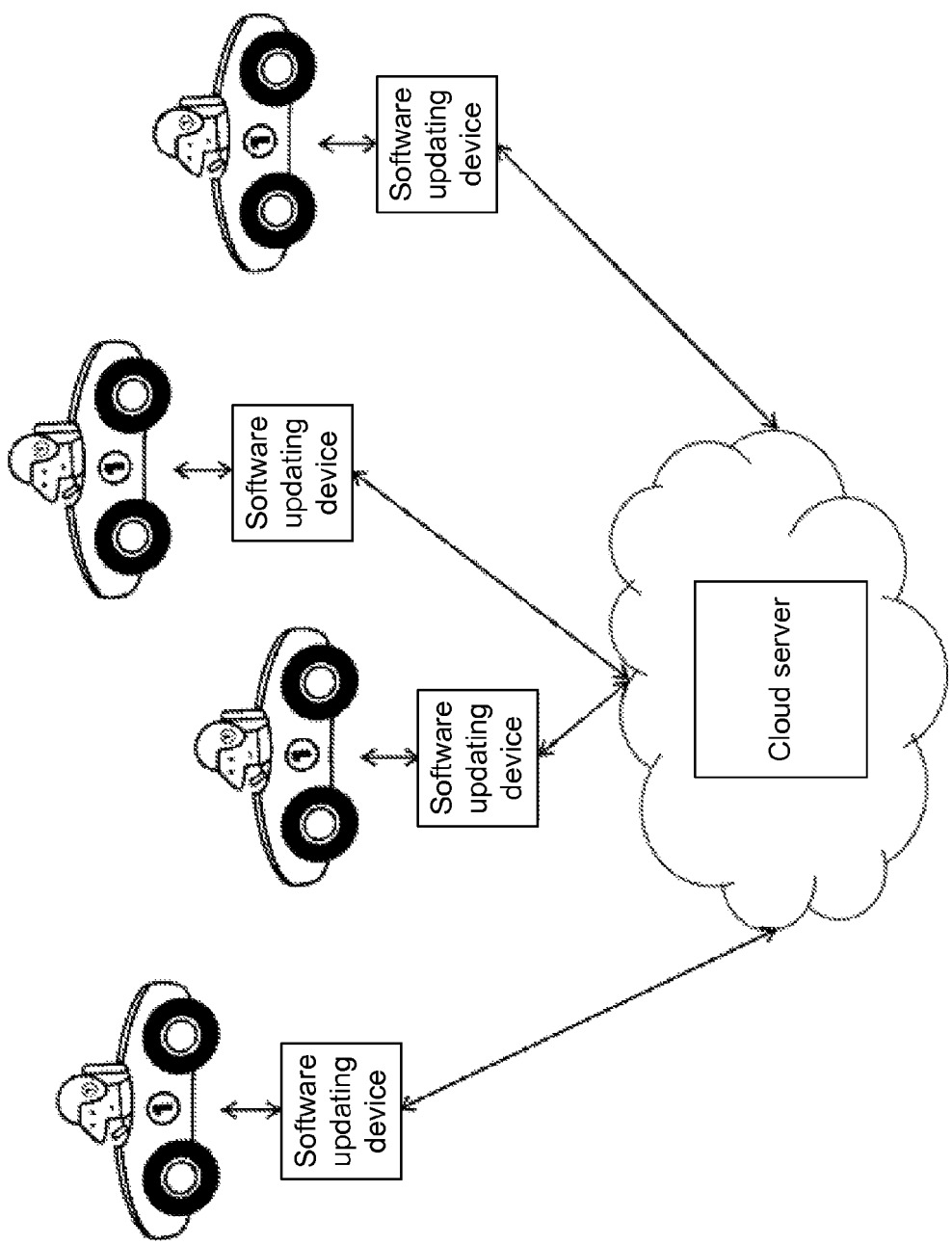
FIG. 5 shows a diagram of offline training of the virtual sensor.

Turning now to FIG. 5, a diagram of multiple vehicles sending and receiving acquired data to a cloud server is shown. In this way, the virtual humidity sensor of the present disclosure may be frequently updated. The cloud server connects to multiple vehicles and receives online training parameters from each of them when they are updated. The aggregation of the online training is used to create a new generation of virtual sensors that are sent to the vehicles when they are updated. The process may continually update a virtual sensor and cloud server.

Training and updating a virtual humidity sensor in accordance with the present disclosure may happen prior to vehicle operation and continually throughout the life of the virtual humidity sensor as long as a cloud server connection may be made. In the case of new vehicles, an offline trained virtual humidity sensor may be installed into one of the vehicle computers. If the vehicle is equipped to receive external data or has an existing, physical humidity sensor the virtual humidity sensor will continue to train while it receives the external data, thus improving its accuracy. Periodically the sensor can be updated in a process that removes and saves the old virtual sensor and replaces it with a new sensor. The old sensor is combined with old sensors from other vehicles and historical weather information and used to train the next generation of virtual sensors. Thus each successive generation of sensors trains the next generation of sensors in a process of continuous improvement. Trained sensors may be uploaded into the cloud periodically and improved through a process of fitness testing (Genetic Algorithms) and/or merging of the parameter data through statistical regression. The black-box model may be improved and trained against unimproved neural nets. Improved neural nets may then be returned to vehicles during routine updates. Trained sensor parameters may also be exchanged between vehicles using vehicle-to-vehicle communication via short-range devices such as DSRC (dedicated short range data communications) or long-range devices such as cellular data services.

FIGS. 6-8 show humidity data as mole percent of $H_2O$ (which differs from specific humidity by a multiplicative factor) for different dates. The figures provide example data that may be provided to a virtual humidity sensor or uploaded to the virtual humidity sensor in vehicle production and potentially update during regularly scheduled maintenance. In this simple example the black box model is a sine curve with a one year cycle time and 3 learned parameters derived from regression; the phase delay, amplitude and average humidity. A similar plot of the residuals between the measured data and the predicted result can be made, and a sine or other curve can be fit to the residuals to estimate the stochastic variability or probabilistic humidity described above. The parameter data may be stored within controller 12, acquired in a connected training phase, or may be collected and stored by a virtual humidity sensor from its own estimations. Furthermore, said data may be uploaded to a cloud server and shared with vehicles as they enter a new region, for example, or in updating a next generation of virtual sensors. FIG. 6 shows daily high, low and average humidity for the city of Detroit, Mich. with a best fit sine function. FIG. 7 shows average humidity and a best fit sine function for Houston, Tex. And FIG. 8 shows daily high, low and average humidity for the city of Phoenix, Ariz. with a best fit sine function.

Figure 9:
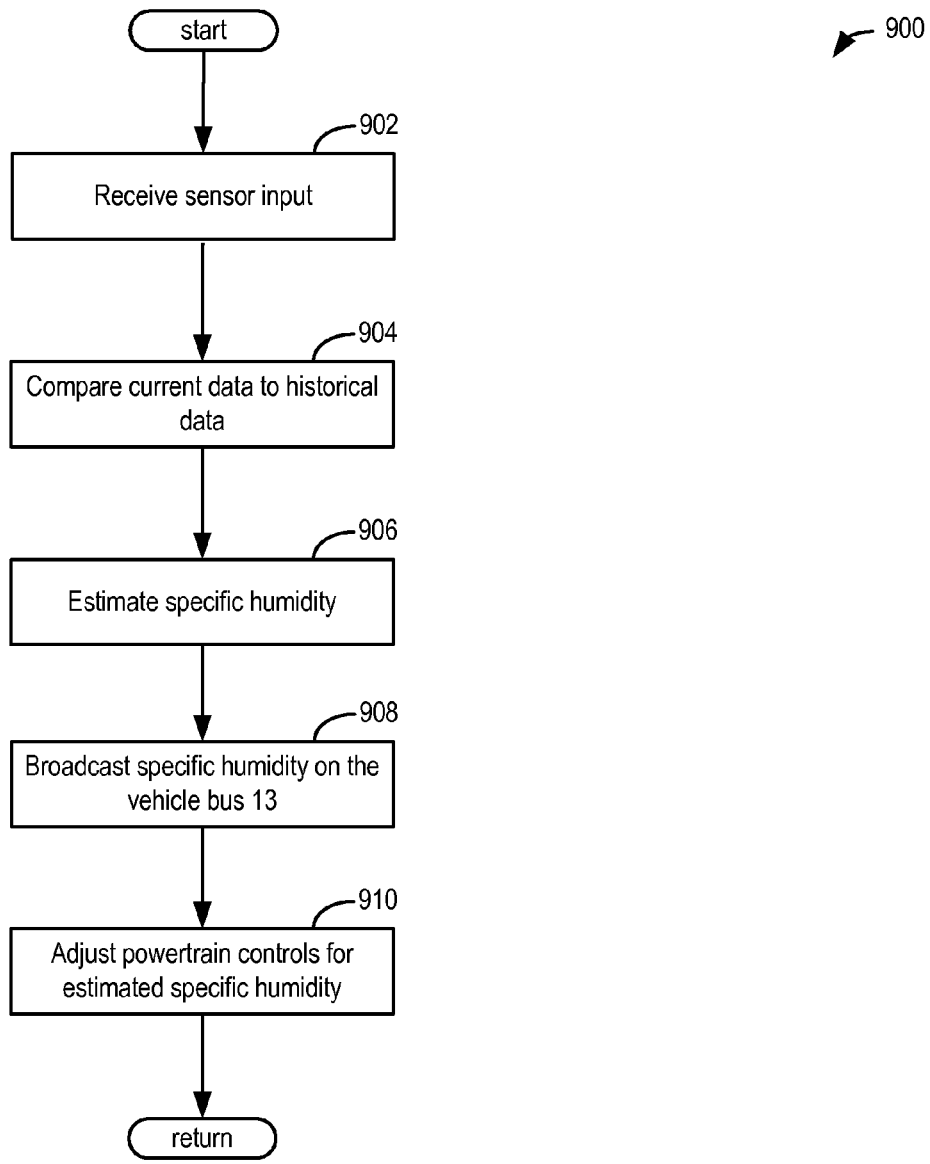
FIG. 9 shows a flowchart of typical operation of the virtual humidity sensor.

Turning now to FIG. 9, a method 900 for a normal operating mode of the virtual humidity sensor is shown. At 902, standard sensor input is received by the vehicle bus. This input may be of any type described above including GPS, MAP pressure, windshield wiper status, temperature etc. At 904, the current data collected from various onboard sensors is compared to current data received in the vehicle logic unit. At 906 the specific humidity is estimated. As described above in reference to Table 1 historical data may be known for the elevation, location, time of year, time of day and ambient temperature in a region, among other conditions. From this and other data, and corresponding historical data a specific humidity may be estimated. At 908, the specific humidity is broadcast onto the vehicle bus 13. At 910, based on the estimated specific humidity power train controls may be adjusted. As non-limiting examples, An EGR rate or spark timing event may be altered based on specific humidity as described above.

Figure 10:
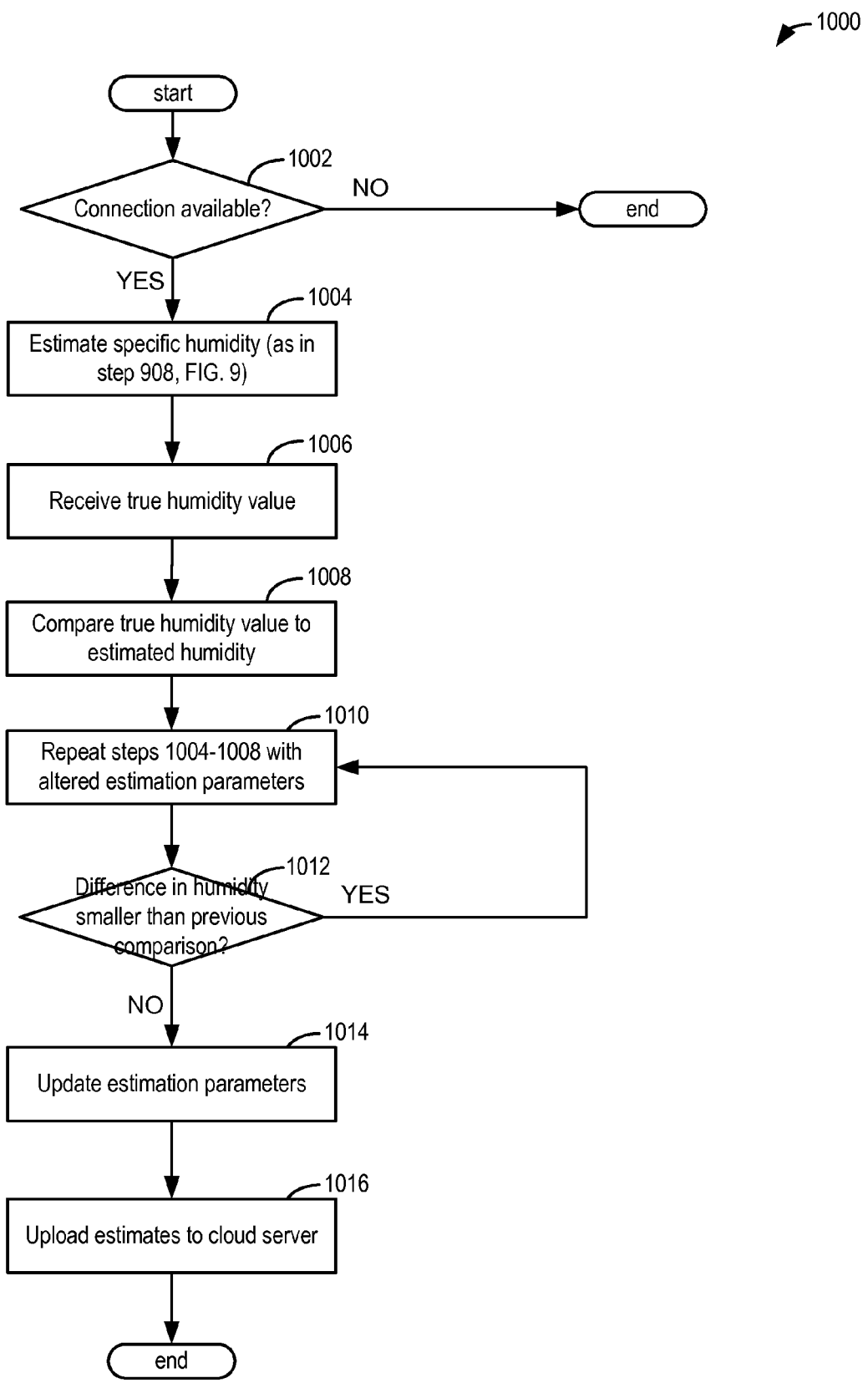
FIG. 10 shows a flowchart of a training mode of the virtual humidity sensor.

Turning now to FIG. 10, a method 1000 for a training mode of the virtual humidity sensor is shown. At 1002, it is assessed if a connection is available. A connection may be a hard wired or wireless connection and may be established between the vehicle logic unit and the internet, satellite radio, or IBOC radio, or other data source suitable to communicate a measured specific humidity to the vehicle bus. If no connection is available (NO) the method ends. If a connection is available (YES) the method proceeds to 1004.

At 1004, a specific humidity is estimated (as in step 908 of FIG. 9). Next, at 1006 a true humidity value is received by the vehicle logic unit via the connection. The estimated humidity (from 1004) and the measured humidity (from 1006) are then compared at 1008. At 1010, steps 1004-1008 are repeated with minor variations to the estimation parameters.

At 1012, a comparison is made between the difference between the two most recent estimates of humidity and the measured humidity. If the difference between the most recent estimation and the and the measured humidity is smaller than the difference between the previous estimation and the measured humidity (YES) the method returns to 1010 to repeat the estimation steps with further alterations to parameters. This is repeated until the difference between the estimation and the measured humidity does not continue to decrease. When the difference in humidity is not smaller than the previous comparison (NO) the method proceeds to step 1014.

At step 1014, the virtual humidity sensor updates its estimation parameters and further uploads the update parameters to the cloud server at step 1016 so they may be considered in updated version of the virtual humidity sensor and available to other vehicles. The method then ends.

Figure 11:
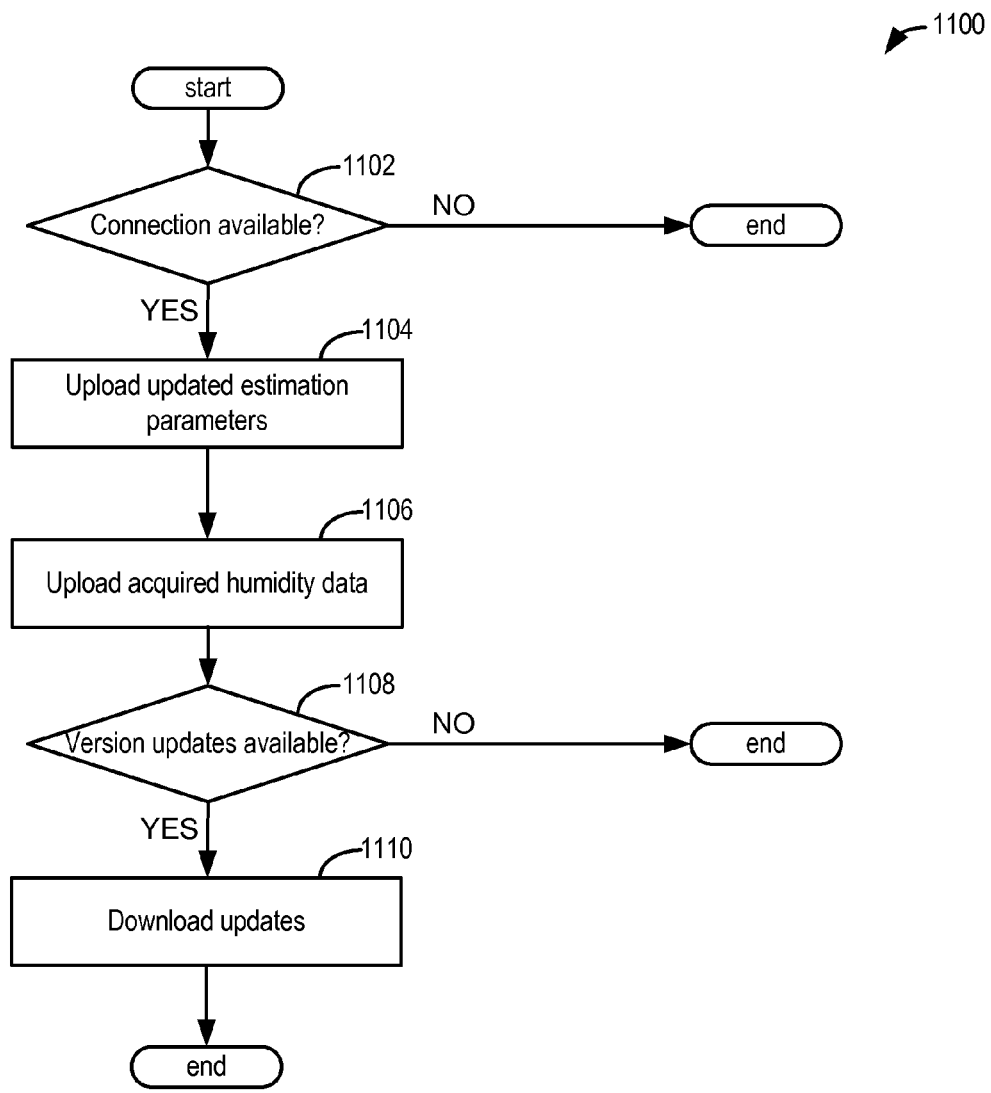
FIG. 11 shows a flowchart of an update mode of the virtual humidity sensor.

Referring to FIG. 11, a method 1100 is shown for the virtual humidity sensor in an update mode. In the update mode a cloud server allows the virtual humidity uploads training module parameter updates and acquired humidity data to a cloud server external to a vehicle in which the powertrain is positioned, the uploading occurring during vehicle operation, and wherein the training module parameter updates and acquired humidity data are generated during vehicle operation.

At 1102 it is assessed if a connection is available. A connection may be wired or wireless, connecting the vehicle logic unit to the internet. If a connection is not available (NO) the method then ends. If a connection is available (YES) the method proceeds to step 1104 where updated estimation parameters from a training mode are uploaded to the cloud. At 1106, the acquired humidity data from operation of the virtual humidity sensor is also uploaded to the cloud expanding upon available data which may possibly be used in future humidity estimations. At 1108, it is assessed if there are version updates available. These may include updated climate data sets or updated humidity estimation algorithms that have been developed in response to feedback from multiple vehicles as uploading to the cloud server is done by multiple vehicles increasing available humidity data and training module parameter updates. If no updates are available (NO), the method then ends. If there are updates available (YES) the updates are downloaded at 1109 and the method then ends.

Systems and methods are provided for adjusting an engine powertrain component responsive to ambient humidity, the ambient humidity based on vehicle position in a region, ambient temperature, and historical humidity data for that region for a current time of year. This may be accomplished without relying on a costly, and often, temperamental physical humidity sensor. Training modules and cloud updates further increase the accuracy of the virtual humidity sensor of the present disclosure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. In fact, battery driven vehicles that do not have any engine may use the object of the present disclosure to control interior cab climate. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting an engine powertrain component of a vehicle responsive to barometric pressure and an estimated ambient humidity, the estimated ambient humidity based on each of vehicle position in a region, a current time of day and/or year, ambient temperature, and data for the region for the current time of day and/or year stored in a memory of a controller;
determining a difference between a measured humidity and the estimated humidity, where the measured humidity is received at the controller when the controller is connected to a data source external to the vehicle;
updating estimation parameters used to estimate the estimated humidity based on the determined difference; and
uploading the updated estimation parameters and acquired humidity data to a cloud server external to the vehicle, the uploading occurring during vehicle operation, and wherein the updated estimation parameters and acquired humidity data are generated during vehicle operation from estimation of the estimated humidity.

2. The method of claim 1, wherein adjusting the engine powertrain component comprises adjusting an exhaust gas recirculation rate based on the estimated humidity by adjusting a component of an exhaust gas recirculation system, where the exhaust gas recirculation system routes a desired portion of exhaust gas from an exhaust passage to an intake manifold via an exhaust gas recirculation passage including an exhaust gas recirculation valve.

3. The method of claim 2, wherein adjusting the engine power train component comprises adjusting engine spark timing.

4. The method of claim 1, further comprising receiving input from onboard components in communication with a vehicle bus, where the input includes at least one of the vehicle position, clock time, ambient temperature, and historical humidity data.

5. The method of claim 1, wherein the engine powertrain component is positioned in the vehicle traveling on a road, the method further comprising adjusting the estimated ambient humidity based on data exchanged with a computer network external to the vehicle.

6. The method of claim 5, wherein the data for the region for the current time of day and/or year includes historical humidity data and further comprising updating the historical humidity data stored in the memory of the controller based on the data exchanged with the computer network.

7. A virtual humidity sensor in a vehicle, comprising:
a vehicle bus adapted to connect to a measured humidity source;
vehicle operating and vehicle condition sensors coupled to the vehicle bus;
a training module coupled to the vehicle bus for comparison of a measured humidity received from the measured humidity source with an estimated humidity; and
a computer readable storage medium with a logic unit coupled to the vehicle bus and including instructions stored therein to:
determine the estimated humidity based on input values from one or more of the vehicle operating and vehicle condition sensors and stored historical humidity data;
update estimation parameters used for determining the estimated humidity based on a comparison of the measured humidity and the estimated humidity at the training module; and
upload the updated estimation parameters from the training module and acquired humidity data from operation of the virtual humidity sensor to a cloud server external to the vehicle.

8. The virtual humidity sensor of claim 7, wherein vehicle condition sensors comprise a global positioning system and wherein engine operating sensors comprise a barometric absolute pressure sensor.

9. The virtual humidity sensor of claim 7, wherein the instructions further include instructions for when a connection between the cloud server and the virtual humidity sensor is available, downloading updated data to the virtual humidity sensor, where the updated data includes one or more of updated climate data sets or updated humidity estimation algorithms.

10. The virtual humidity sensor of claim 7, wherein vehicle condition sensors comprise a windshield wiper status sensor and wherein the stored historical humidity data is stored within a memory of the logic unit.

11. The virtual humidity sensor of claim 7, wherein the measured humidity source is data from an internet connection with the logic unit.

12. The virtual humidity sensor of claim 7, wherein the measured humidity source is data from a satellite radio connected via a wired or wireless connection with the logic unit.

13. The virtual humidity sensor of claim 7, wherein the measured humidity source is data from an IBOC radio connected via a wired or wireless connection with the logic unit.

14. A method, comprising:
estimating a humidity based on vehicle data onboard a vehicle, the vehicle data comprising a global positioning system location, an ambient temperature, a barometric pressure, and stored humidity data, look-up tables and formulas; and
uploading acquired humidity estimates and training module parameter updates to a cloud server external to the vehicle.

15. The method of claim 14, further comprising connecting to one or more of an internet connection and IBOC radio when available, to receive an externally measured humidity.

16. The method of claim 15, wherein the training module parameter updates are updated estimation parameters for estimating the humidity and further comprising determining the updated estimation parameters based on a comparison between the estimated humidity and the received externally measured humidity.

17. The method of claim 14, wherein the vehicle data further comprises a date, time, and elevation.

18. The method of claim 15, wherein the estimating is performed via a virtual humidity sensor included in a controller of the vehicle and further comprising training the virtual humidity sensor prior to vehicle use, wherein training the virtual humidity sensor comprises repeatedly estimating the humidity until a difference between the estimated humidity and the received externally measured humidity ceases to decrease with each repetition.

19. The method of claim 14, wherein the cloud server is adapted to connect to multiple vehicles and receive online training parameters from each of them when they are updated, the method further comprising downloading information from the cloud server and estimating the humidity based on the downloaded information.

* * * * *